United States Patent
Males et al.

(10) Patent No.: US 10,896,150 B2
(45) Date of Patent: Jan. 19, 2021

(54) PREDICTING NEED TO RENAME OBSCURELY NAMED DOCUMENTS

(71) Applicant: International Business Machines Corporation, Armonk, NY (US)

(72) Inventors: Kevin Males, Bishop's Stortford (GB); Lewis Francis Dutton, Braintree (GB); Alister James Brain, Cambridge (GB); Ian Philip Kitchen, Bishops Stortford (GB)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 16/140,512

(22) Filed: Sep. 24, 2018

(65) Prior Publication Data
US 2020/0097565 A1 Mar. 26, 2020

(51) Int. Cl.
*G06F 16/16* (2019.01)
*G06F 40/20* (2020.01)

(52) U.S. Cl.
CPC ............ *G06F 16/166* (2019.01); *G06F 40/20* (2020.01)

(58) Field of Classification Search
CPC ................................ G06F 16/166; G06F 40/20
See application file for complete search history.

(56) References Cited

U.S. PATENT DOCUMENTS

| | | | |
|---|---|---|---|
| 2004/0220925 A1 | 11/2004 | Liu et al. | |
| 2015/0142888 A1* | 5/2015 | Browning | G06F 16/285 709/204 |
| 2016/0171084 A1 | 6/2016 | Kraley | |
| 2016/0357781 A1* | 12/2016 | Bastide | G06F 16/164 |

OTHER PUBLICATIONS

Neuhaus, Rob, "Gibberish-Detector, A small program to detect gibberish using a Markov Chain", GitHub, https://github.com/rrenaud/Gibberish-Detector, [retrieved Sep. 21, 2018].
Stack Overflow, "Is there any way to detect strings like putjbtghguhjjjanika?", Stack Overflow, https://stackoverflow.com/questions/6297991/is-there-any-way-to-detect-strings-like-%20putjbtghguhjjjanika/6298040#comment-7360747, [retrieved Sep. 21, 2018].

* cited by examiner

*Primary Examiner* — Loc Tran
(74) *Attorney, Agent, or Firm* — North Shore Patents, P.C.; Michele Liu Baillie

(57) ABSTRACT

Embodiments generally relate to file names. In some embodiments, a method includes reading a file name of a file associated with a download operation. The method further includes generating a readability score associated with the file name based at least in part on a combination of characters in the file name. The method further includes comparing the readability score to a predetermined readability threshold. The method further includes generating a user alert if the readability score falls below the predetermined readability threshold. The method further includes enabling a user to change the file name to be readable to the user.

20 Claims, 5 Drawing Sheets

94100H
9B0F-00-14-00-00
FMV_FAQ_v1.2
1173
12-09-2015
259770
259881
274536
7379602
743
TS5_GP070085
TS5_GP070086
FDSRPDF-2017-03-07
IMG_0023
IMG_0344
IMG_0418
IMG_20160110

Defense Intelligence Analysis in the Age of Big Data National Defense Universi
Defense Intelligence Analysis in the Age of Big Data National Defense Universi (1)
Capabilities Comparison, Infostore perspective-v2 (1)
ET Collaboration
Some sample Tattoo Similarity Searches using Watson Collections v1
Intelligence Analysis Software Licenses, Renewals & Maintenance I
Install
G2 Route Configuration
Accounting for R&D costs_purchased intangible_clean

PREDICTING NEED TO RENAME OBSCURELY NAMED DOCUMENTS

BACKGROUND

Documents are often named according to a local context such as a paper from a conference proceeding or an image in a gallery of photographs. However, when a user downloads a document from a website and stores the document in a local file system (e.g., in a downloads folder), it can be difficult for a user to later recall the content of the document from its name, especially when out of context. Furthermore, downloaded files are typically mixed with other documents downloaded from other sources. In many cases, documents are dynamically generated before downloading and are often given machine-generated names such as a globally unique identifier (GUID), etc. Such machine-generated names are typically meaningless to a human reader. Conventional systems do not address this problem. This typically requires a user to open a given document to see the content and then rename it accordingly.

SUMMARY

Disclosed herein is a method for predicting a need to rename obscurely named documents, and a system and computer program product as specified in the independent claims. Embodiments are given in the dependent claims. Embodiments can be freely combined with each other if they are not mutually exclusive.

In an embodiment, a method includes reading a file name of a file associated with a download operation. The method further includes generating a readability score associated with the file name based at least in part on a combination of characters in the file name. The method further includes comparing the readability score to a predetermined readability threshold. The method further includes generating a user alert if the readability score falls below the predetermined readability threshold. The method further includes enabling a user to change the file name to be readable to the user.

In another embodiment, the generating of the readability score occurs before the file is saved to a local file system. In another aspect, the generating of the readability score occurs after the file is saved to a local file system. In another aspect, the method further includes comparing the combination of characters in the file name to words of a predetermined natural language. In another aspect, the method further includes identifying one or more character pairs in the combination of characters in the file name, and generating the readability score based on the one or more character pairs. In another aspect, the method further includes adjusting the predetermined readability threshold over time in order to match a user tolerance to obscure names. In another aspect, the method further includes tracking a frequency of file name changes associated with a plurality of download operations, where the file associated with the download operation is among a plurality of files associated with the plurality of download operations; and adjusting the predetermined readability threshold based at least in part on the frequency of file name changes.

BRIEF DESCRIPTION OF THE DRAWINGS

FIG. 3 is an example list of obscure file names from a downloads folder, according to some embodiments.

FIG. 4 is an example list of meaningful file names from a downloads folder, according to some embodiments.

DETAILED DESCRIPTION

Embodiments described herein predict the need to rename obscurely named documents to more meaningful or memorable names. As described in more detail herein, a system calculates a readability measure or score of a filename of a file prior to the file being saved to a local file system of a user (e.g., by download from a web site, etc.). If the readability score is below a given readability threshold, the system alerts the user, where the alert informs the user that the file name might not be meaningful or memorable. The system then gives the user an opportunity to change the file name to a more meaningful name.

In some embodiments, a system reads a file name of a file associated with a download operation. The system then generates a readability score associated with the file name based at least in part on a combination of characters in the file name. The system compares the readability score to a predetermined readability threshold. The system generates a user alert if the readability score falls below the predetermined readability threshold, and enables the user to change the file name to be readable and/or meaningful to the user.

Figure 1:
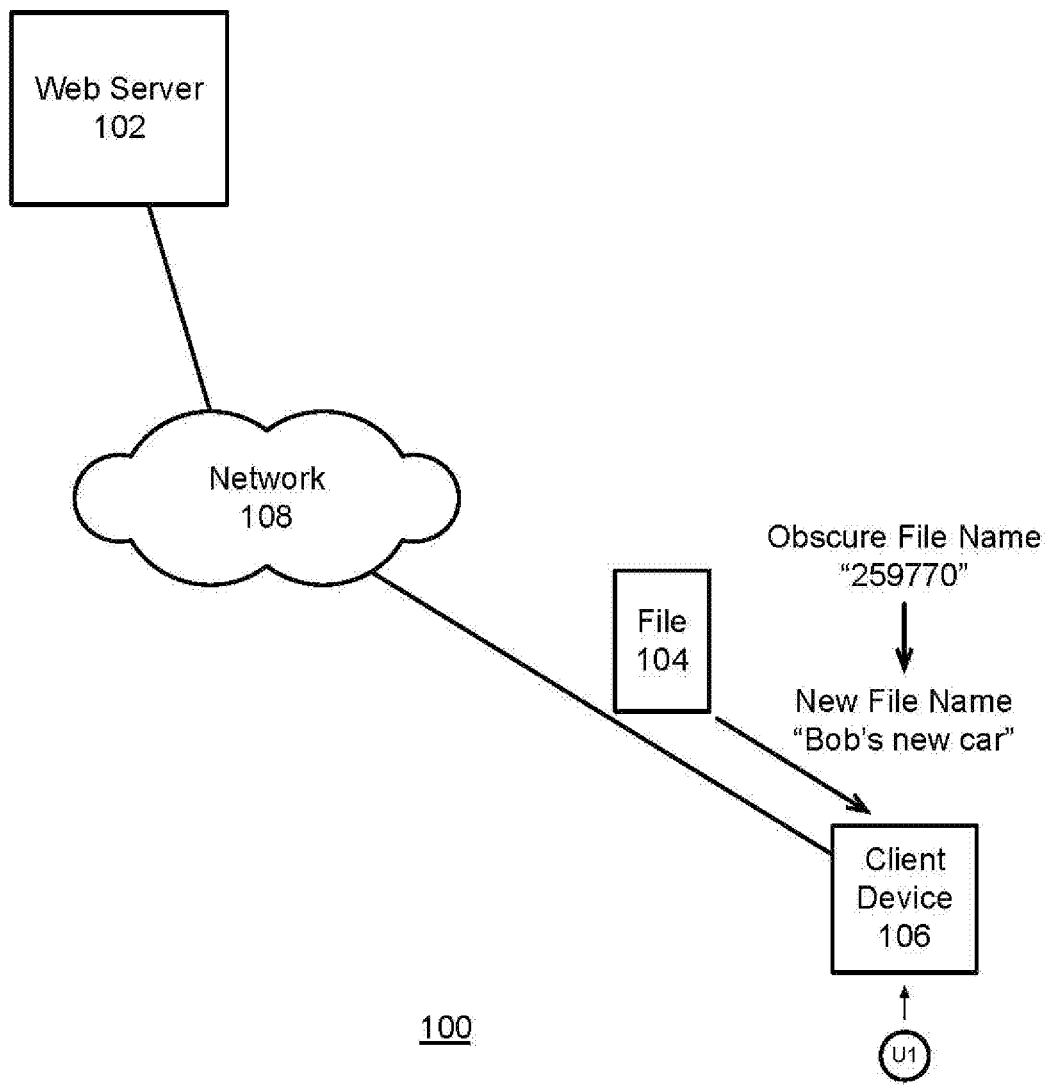
FIG. 1 is an example environment, where a file is downloaded from a remote web server to a client device, according to some embodiments.

FIG. 1 is an example environment 100, where a file is downloaded from a remote web server to a client device, according to some embodiments. Shown is a remote web server 102, which stores content such as a file 104. Also shown is a client device 106, where a user U1 is downloading file 104 from web server 102 to client device 106 via a network such as network 108.

As described in more detail herein, a system such as client device 106 detects whether the file name of file 104 is obscure (e.g., "259770"). In this scenario, the file name of file 104 is machine-generated. Because the file name is obscure, the system alerts user U1 that the file name is obscure and enables the user U1 to change the file name if desired. In this example, file 104 is a photo of a car, and the user U1 changes the file name to a new file name (e.g., Bob's new car). The file name "Bob's new car" is more meaningful to the user than "259770." Further example embodiments are described in more detail herein.

For ease of illustration, FIG. 1 shows one block for each of web server 102, client device 106, and network 108. Blocks 102, 106, and 108 may represent multiple web servers, client devices, and networks. Also, there may be any number of files 104 that are downloaded from various remote sources. Also, the downloaded files may be downloaded in a group of files (e.g., in zipped folders containing multiple files, etc.). In other implementations, environment 100 may not have all of the components shown and/or may have other elements including other types of elements instead of, or in addition to, those shown herein.

While client device 106 performs embodiments described herein, in other embodiments, any suitable system associated with client device 106 or any suitable processor or processors associated with client device 106 may facilitate performing the embodiments described herein.

Figure 2:
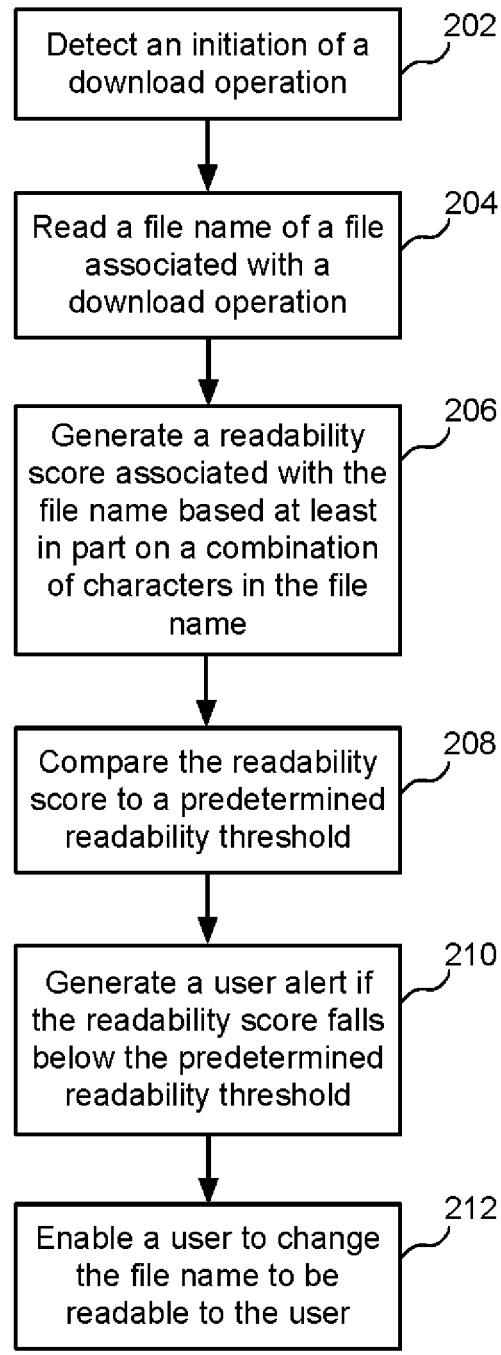
FIG. 2 is an example flow diagram for predicting a need to rename obscurely named documents, according to some embodiments.

FIG. 2 is an example flow diagram for predicting a need to rename obscurely named documents, according to some embodiments. As described in more detail herein, the system alerts the user to downloaded files that may have obscure file names, and the system enables the user to change each file name to a name that is more meaningful to the user. Referring to both FIGS. 1 and 2, a method begins at block 202, where a system such as client device 106 detects an initiation of a download operation.

At block 204, the system reads the file name of the file associated with a download operation. As described in the example above, the file name may be "259770," for example. Also, the file may be downloaded from a remote website, for example.

At block 206, the system generates a readability measure or score associated with the file name based at least in part on a combination of characters in the file name. Such characters may include letters, digits/numbers, and symbols, where combinations thereof form a character string. The readability score indicates how readable or understandable the file name is to a person. The system may apply various statistical measures to generate the readability score. For example, the system may determine the likelihood that a sequence of characters in the file name is part of a natural language word of the user's natural language. In some embodiments, the system may determine the user's language in various ways (e.g., from settings on the user's computer, from identification of the other file names and/or other documents, etc.).

In the example of FIG. 1, the file name of "259770" is all numbers and would have a low readability score. This is because the number "259770" does not have meaning. In other words, a user would not know what the content of the file is based on the number "259770." This is common when file names are machine-generated. Various example embodiments directed to the generation of readability scores are described in more detail herein.

In various embodiments, the system may generate the readability score at different times. For example, in some embodiments, the system may generate the readability score before the file is saved to a local file system. In some embodiments, the system may generate the readability score after the file is saved to a local file system.

At block 208, the system compares the readability score to a predetermined readability threshold. The readability threshold is the threshold for triggering a warning or alert that the file name is obscure. As described in more detail herein, the comparison between the readability score and the predetermined readability indicates whether a given file name is human readable or obscure. The following step provides clarification.

At block 210, the system generates a user alert if the readability score falls below the predetermined readability threshold. For example, if the readability score is 0.2 and the predetermined threshold is 0.5, the readability score falls below the predetermined threshold. As such, the file name is probably obscure/not readable (e.g., not understandable/not meaningful/not memorable, etc.) to a typical person. As such, the system alerts the user of the potential obscurity of the file name.

FIG. 3 is an example list 300 of obscure file names from a downloads folder, according to some embodiments. In this example, the file names have been scored using a trained letter pair transition model. The file names shown are sorted by score from the lowest score (least readable/meaningful) to the highest score (more readable/meaningful). For example, the file name 94100H has a lower score, which indicates that the file name is less meaningful. The file name IMG_20150110 has a higher score, which indicates that the file name is more meaningful than lower scoring file names. These example file names will generally prompt an alert, where the lower scored file names are more likely to be flagged as obscure. A user may then rename such files to more meaningful file names.

At block 212, the system enables the user to change the file name to be readable to the user. For example, the system may provide "Yes" and "No" buttons, where the user may indicate whether the user wants to change the file name. If the user selects "Yes," the system may provide a field in a window that enables the user to type in a new file name. As such, the user can change the file name to one that is more meaningful or memorable. As such, embodiments described herein provide various benefits. For example, embodiments help users to rename file names to more meaningful file names as needed. Embodiments also help to prevent users from losing/misplacing files due to unreadable machine-generated names.

In some embodiments, the system may generate a file name that is meaningful or memorable. For example, after the system provides an alert to the user indicating a possible obscure file name, the system may automatically, without user intervention, generate a new file name that is meaningful or memorable, and present the new file name to the user. In some embodiments, the system may present the "Yes" and "No" buttons, where the user may indicate whether to change the file name. If the user selects "Yes," The system may provide the new file name in a field. In some embodiments, the system may generate and present a suggested new file name to the user, where the user may accept or reject the suggested file name. If accepted, the system may proceed to rename the file. If not accepted, the system may generate another suggested file name. The system may also enable the user to change the suggested file name or to provide a new file name. The system may utilize any suitable cognitive model for generating a suggested file name.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

In some embodiments, when generating a readability score, the system may generate a score with a numeric range such as between "0" and "1," where "0" is obscure/meaningless and "1" is understandable/meaningful. In some embodiments, the system may initially set the readability threshold to a given number such as 0.5. As such, a readability score of 0.2 would fall below the readability threshold of 0.5, which would trigger an alert to the user. A readability score of 0.7 would be above the readability threshold of 0.5, which would not trigger an alert to the user. In some embodiments, the system may enable the user to set the readability threshold if desired.

In various embodiments, the system compares the combination of characters in the file name to words of a predetermined natural language such as English. In various embodiments, the system identifies one or more character pairs in the combination of characters in the file name. The system then generates the readability score based on the one or more character pairs. For example, the system may apply a model based on the probability of character transitions between pairs of letters. The model involve a matrix that is trained either on a generic document corpus of sample words of a natural language such as English (assuming files are named using common language words). The matrix may also be trained on a representative set of file names relevant to the user (e.g., files already stored in their local file system). In various embodiments, the system may analyze a corpus of words to determine, for every letter, a count of how many times the letter is followed by every other letter. For example, in the English language, the number of times the letter A follows a given consonant is greater then the number of times the letter K follows a given consonant, etc. In various embodiments, the system analyzes the character transitions (e.g., combination and order of two sequential characters) in a given file name and determines if that the character transition matches a character transition of an actual word. The system then computes an overall readability score for the combination and sequence of characters in the file name. The system may use any statistical and mathematical algorithm (e.g., Markov chain, etc.) to determine readability of the file name.

In some embodiments, the readability score may inversely or negatively correlate to a measure or score of string randomness. For example, if the character string of a file name is more random (e.g., 34Kr6B #), the readability score would be lower. If the character string of a file name is less random (e.g., IMG_0023), the readability score would be higher.

FIG. 4 is an example list 400 of meaningful file names from a downloads folder, according to some embodiments. In this example, the file names would have high readability scores and thus would not be flagged as obscure. For example, the file name "Defense Intelligence Analysis in the Age of Big Data National Defense Universi" includes a character string having words from a natural language (e.g., English). As such, the file name is readable or meaningful to a typical user.

In various embodiments, the system adjusts the predetermined readability threshold over time in order to match a user tolerance to obscure names. For example, if the user keeps changing/renaming file names due to their obscurity, the system may increase the readability threshold. This would increase the frequency of alerts, as more file names are likely to trigger such alerts. If the user does not change file names after downloading many files, the system may decrease/reduce the readability threshold. Some file names may have a certain level obscurity, yet not be so unusual as to warrant name changes. Reducing the readability threshold would decrease the frequency of alerts, as fewer file names are likely to trigger such alerts. For example, the file name "IMG_0023" may be somewhat obscure, but the user may recognize that the character combination "IMG" is associated with the English word "image." The user may want to rename only some image files and at a later time. As such, the user may not want to be alerted each time a file with the characters "IMG" in the file name is downloaded.

In various embodiments, the system tracks a frequency of file name changes associated with multiple download operations. While example embodiments are described herein in the context of a particular file associated with a particular download operation, each file may be among multiple files associated with multiple respective download operations. The system adjusts the predetermined readability threshold based at least in part on the frequency of file name changes. For example, if the user keeps changing file names, the system may drop the readability threshold (e.g., from a 0.5 to a 0.4 or 0.35, etc.). This gives the user more opportunities to change file names. In contrast, if the user keeps declining opportunities to change file names, the system may increase the readability threshold (e.g., from a 0.5 to a 0.6 or 0.65, etc.). Pushing the readability threshold up requires more evidence that a given file name is obscure (e.g., fewer character combinations that match natural language words such as English words, or portions of natural language words).

In various embodiments, the system may apply the same readability threshold to all file names. In some embodiments, the system may adjust the readability threshold based on actual characters in a given file name. For example, if the system detects the characters "IMG" in file names where the user has elected not to change the file names, the system may apply a lower readability threshold.

In various embodiments, the readability threshold is initially set based on passing a fixed proportion of the training corpus as valid names. The system then maintains a record of the previous N decisions made by the user when warned about a complex, potentially obscure file name. In some embodiments, if the number of renames is above a trigger proportion (e.g., 80%), the readability threshold is dynamically increased by a small increment to increase the likelihood of a file name triggering an alert. Conversely, if the number of renames is below a trigger proportion (e.g., 20%), the threshold is dynamically decreased by a small increment to reduce the likelihood of a file name triggering an alert.

Figure 5:
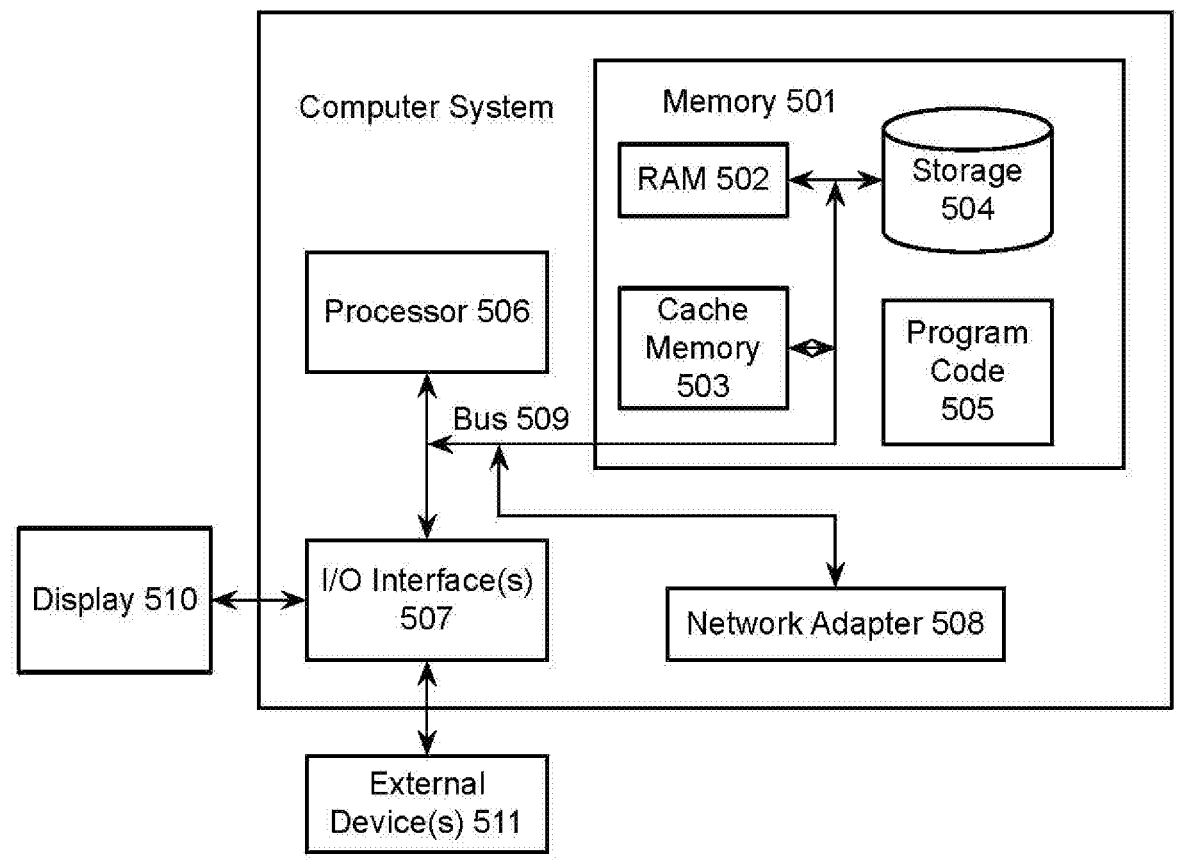
FIG. 5 is a block diagram of an example computer system, which may be used for embodiments described herein.

FIG. 5 is a block diagram of an example computer system 500, which may be used for embodiments described herein. The computer system 500 is operationally coupled to one or more processing units such as processor 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or storage 504, which may include non-volatile storage media or other types of memory. The memory 501 may include at least one program product having a set of at least one program code module such as program code 505 that are configured to carry out the functions of embodiment of the present invention when executed by the processor 506. The computer system 500 may also communicate with a display 510 or one or more other external devices 511 via input/output (I/O) interfaces 507. The computer system 500 may communicate with one or more networks via network adapter 508.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A system comprising:
 at least one processor and a computer readable storage medium having program instructions embodied therewith, the program instructions executable by the at least one processor to cause the at least one processor to perform operations comprising:

reading a file name of a file associated with a download operation;

generating a readability score associated with the file name based at least in part on a combination of characters in the file name;

comparing the readability score to a predetermined readability threshold;

generating a user alert if the readability score falls below the predetermined readability threshold; and enabling a user to change the file name to be readable to the user.

2. The system of claim 1, wherein the generating of the readability score occurs before the file is saved to a local file system.

3. The system of claim 1, wherein the generating of the readability score occurs after the file is saved to a local file system.

4. The system of claim 1, wherein the at least one processor further performs operations comprising comparing the combination of characters in the file name to words of a predetermined natural language.

5. The system of claim 1, wherein the at least one processor further performs operations comprising:

identifying one or more character pairs in the combination of characters in the file name; and generating the readability score based on the one or more character pairs.

6. The system of claim 1, wherein the at least one processor further performs operations comprising adjusting the predetermined readability threshold over time in order to match a user tolerance to obscure names.

7. The system of claim 1, wherein the at least one processor further performs operations comprising:

tracking a frequency of file name changes associated with a plurality of download operations, wherein the file associated with the download operation is among a plurality of files associated with the plurality of download operations; and adjusting the predetermined readability threshold based at least in part on the frequency of file name changes.

8. A computer program product comprising a computer readable storage medium having program instructions embodied therewith, the program instructions executable by at least one processor to cause the at least one processor to perform operations comprising:

reading a file name of a file associated with a download operation;

generating a readability score associated with the file name based at least in part on a combination of characters in the file name;

comparing the readability score to a predetermined readability threshold;

generating a user alert if the readability score falls below the predetermined readability threshold; and enabling a user to change the file name to be readable to the user.

9. The computer program product of claim 8, wherein the generating of the readability score occurs before the file is saved to a local file system.

10. The computer program product of claim 8, wherein the generating of the readability score occurs after the file is saved to a local file system.

11. The computer program product of claim 8, wherein the at least one processor further performs operations comprising comparing the combination of characters in the file name to words of a predetermined natural language.

12. The computer program product of claim 8, wherein the at least one processor further performs operations comprising:

identifying one or more character pairs in the combination of characters in the file name; and generating the readability score based on the one or more character pairs.

13. The computer program product of claim 8, wherein the at least one processor further performs operations comprising adjusting the predetermined readability threshold over time in order to match a user tolerance to obscure names.

14. The computer program product of claim 8, wherein the at least one processor further performs operations comprising:

tracking a frequency of file name changes associated with a plurality of download operations, wherein the file associated with the download operation is among a plurality of files associated with the plurality of download operations; and adjusting the predetermined readability threshold based at least in part on the frequency of file name changes.

15. A computer-implemented method for predicting a need to rename obscurely named documents, the method comprising:

reading a file name of a file associated with a download operation;

generating a readability score associated with the file name based at least in part on a combination of characters in the file name;

comparing the readability score to a predetermined readability threshold;

generating a user alert if the readability score falls below the predetermined readability threshold; and enabling a user to change the file name to be readable to the user.

16. The method of claim 15, wherein the generating of the readability score occurs before the file is saved to a local file system.

17. The method of claim 15, wherein the generating of the readability score occurs after the file is saved to a local file system.

18. The method of claim 15, further comprising comparing the combination of characters in the file name to words of a predetermined natural language.

19. The method of claim 15, further comprising:

identifying one or more character pairs in the combination of characters in the file name; and generating the readability score based on the one or more character pairs.

20. The method of claim 15, further comprising adjusting the predetermined readability threshold over time in order to match a user tolerance to obscure names.

\* \* \* \* \*